F. W. AXTELL.
PUMP JACK FOR DOUBLE ACTING PUMPS.
APPLICATION FILED OCT. 11, 1912.
Reissued Jan. 19, 1915.
13,870.
2 SHEETS—SHEET 1.
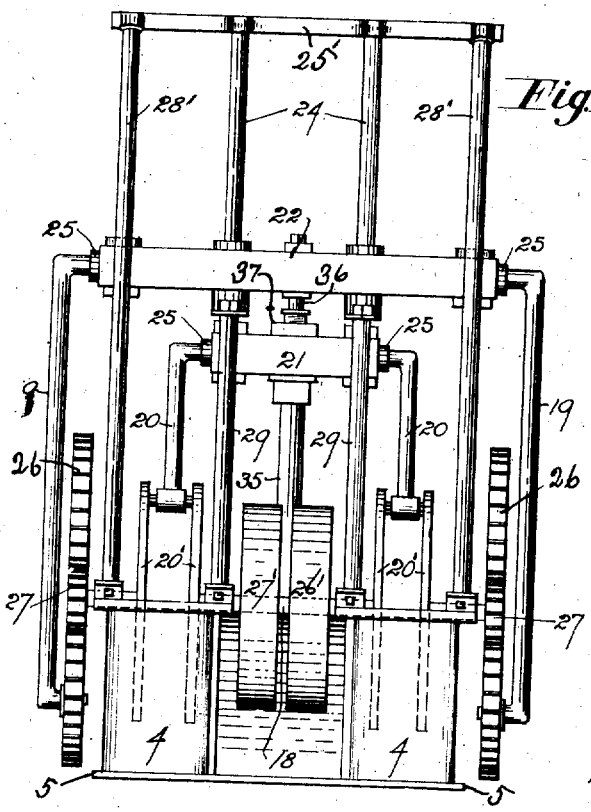
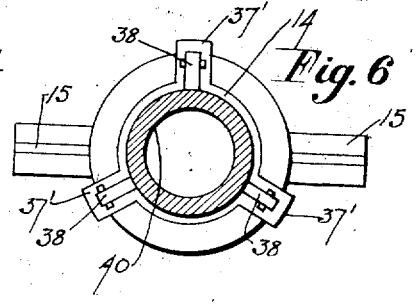
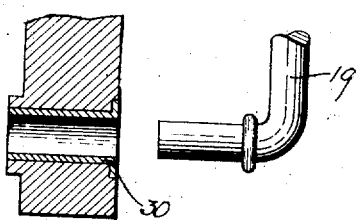
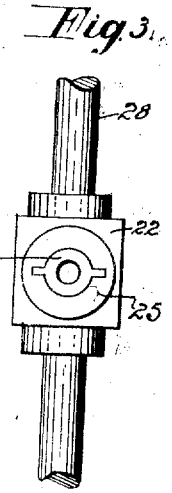
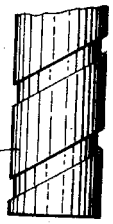
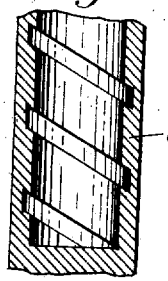
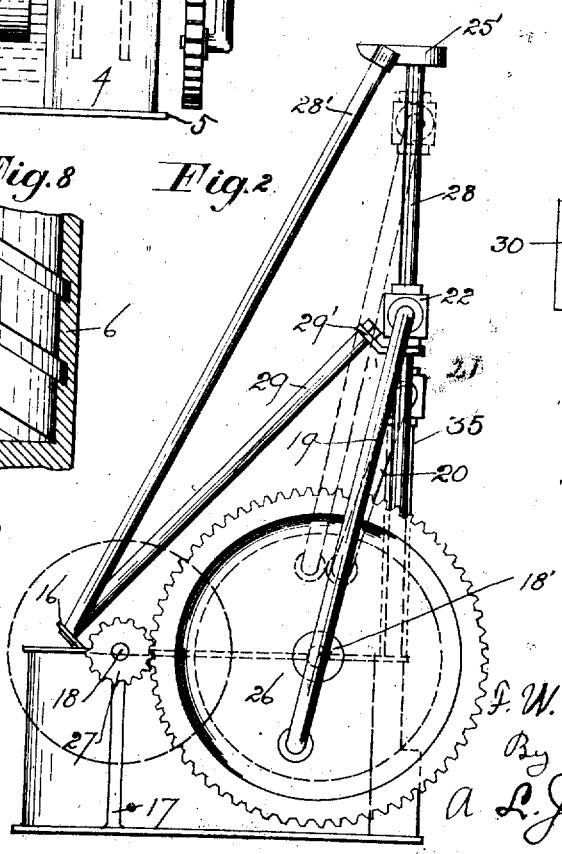
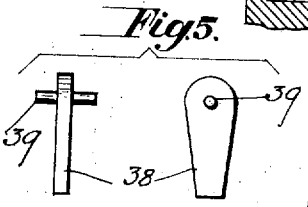
Witnesses
L. T. Knight
J. W. Stitt
Inventor,
F. W. Axtell,
By
A. L. Jackson,
Attorney F. W. AXTELL.
PUMP JACK FOR DOUBLE ACTING PUMPS.
APPLICATION FILED OCT. 11, 1912.
Reissued Jan. 19, 1915.
13,870.
2 SHEETS—SHEET 2.
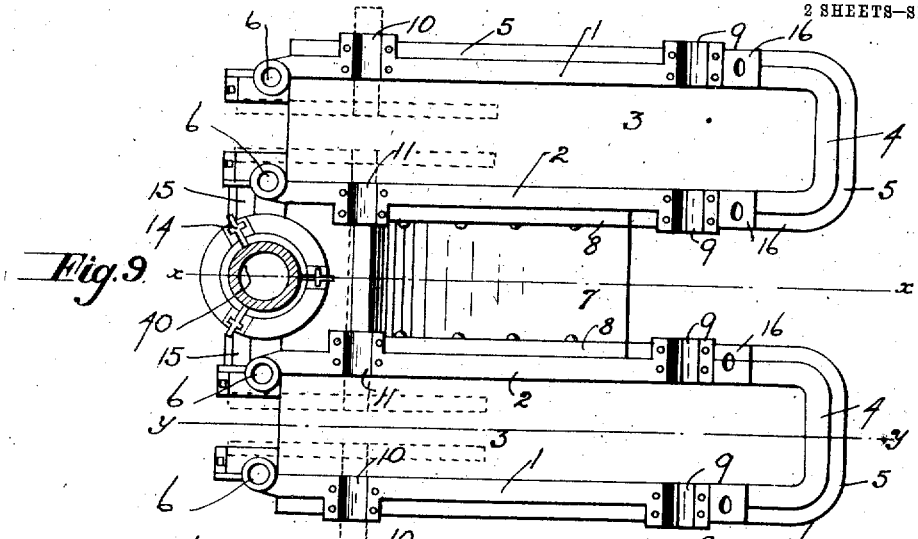
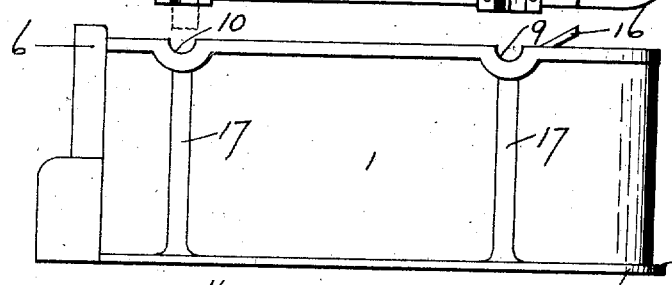
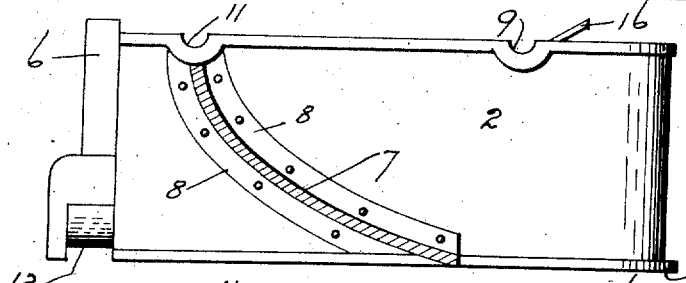
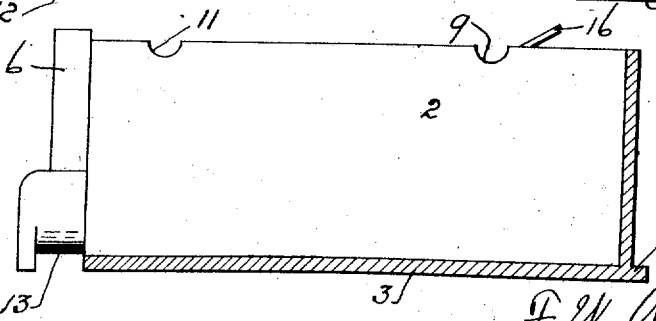
Witnesses
L. T. Knight
J. W. Stitt
Inventor,
F. W. Axtell,
By A. D. Jackson,
Attorney

UNITED STATES PATENT OFFICE.

FRED W. AXTELL, OF FORT WORTH, TEXAS.

PUMP-JACK FOR DOUBLE-ACTING PUMPS.

13,870. Specification of Reissued Letters Patent. Reissued Jan. 19, 1915.

Original No. 1,024,921, dated April 30, 1912, Serial No. 659,232. Application for reissue filed October 11, 1912. Serial No. 725,320.

*To all whom it may concern:*

Be it known that I, FRED W. AXTELL, a citizen of the United States, residing at Fort Worth, in the county of Tarrant and State of Texas, have invented certain new and useful Improvements in Pump-Jacks for Double-Acting Pumps, of which the following is a specification.

This invention relates to pump jacks for double acting pumps, and the object is to provide a pump jack which is double geared, heavy, and compactly built, requiring very little floor space, and especially adapted for heavy duty.

Another object is to provide the pump with forged steel pitmen with bent and machine turned ends which work in bronze bearings at both ends which are easily removed, inexpensive and interchangeable and in which the longitudinal center of the bearing is in line with a plane which runs through the vertical center of the gear wheel and pinion for preventing cross strain.

Another object is to provide an improved base for supporting and holding the working parts securely in operative relation and to provide rifled sockets for the upright guide rods in the base.

Another object is to provide bearings for the drive wheel that are off-set relative to the center of the cross heads which drive the piston rods whereby a great advantage is obtained in operating power.

Another advantage is that each piston rod is attached to the middle of the cross head in such manner as to give a parallel movement of the same, reducing the stuffing box friction to a minimum.

Other objects and advantages will be fully explained in the following description and the invention will be more particularly pointed out in the claims.

Reference is had to the accompanying drawings which form a part of this application.

Figure 1 is a rear elevation of the pump jack complete; Fig. 2 is a side elevation of the pump jack, the drive pulley being shown only in dotted outline; Fig. 3 is an end view of a bronze bearing for a cross head; Fig. 4 is a section of a similar bearing in the drive wheel; Fig. 5 are detail views, being an edge and a side view of the dog used in the universal pipe centering device; Fig. 6 is a plan view of a universal pipe centerer; Fig. 7 is a view of the lower end of one of the guide rods; Fig. 8 is a section of one of the sockets for the guide rods; Fig. 9 is a plan view of the entire base with all working parts omitted; Fig. 10 is a side elevation of the same; Fig. 11 is a vertical section of the base taken on the line $x$—$x$ of Fig. 9, omitting the pipe centerer; and, Fig. 12 is a vertical section taken on the line $y$—$y$ of Fig. 9 looking toward the center.

Similar characters of reference are used to indicate the same parts throughout the several views.

The jack is provided with a base which is composed of two trough like castings and each casting is composed of outer walls 1 and inner wall 2 and end walls 4 and with a bottom 3 which is integral with the side and end walls. The walls 1—1 and 2—2 constitute the bearing walls for the driving gear and also the bearing walls for the piston driving gear.

The castings are provided with flanges 5 and on the front ends of the castings are formed vertical sockets 6. The two castings are rigidly connected together by a curved flange casting 7 which has flanges 8, riveted to the inner walls 2 of the bearing castings. The bearing walls 1—1 are provided with bearings 10 and the bearing walls 2—2 are provided with bearings 11 for the shafts of the piston driving wheels and for the crank disks. These bearing walls are also provided with bearings 9 for the main driving shaft. The inner walls 2 have cut outs 12 and 13 for the arms 15 which are integral with the pipe centerer 14. The arms 15 of this pipe centerer are placed under the ends of the castings so that when the castings are bolted down to the base timbers the pipe centerer will be held rigidly in place. The shaft 18 which is the main driving shaft is journaled in the bearings 9. The bearing walls have ears 16 cast integral therewith to receive the ends of the braces 28′ and 29. The braces 28′ are inserted in the ears 16 of the outer walls 1 and in sockets formed in the tie bar 25′. The braces 29 are inserted at the lower ends in the ears 16 of the inner walls 2 and in clips 29′ which are secured to the central uprights 24 at points which are not reached by either cross head 21 or 22. The cross head 21 drives an outer piston rod 35 and the cross head 22 drives the inner piston rod 36, the piston rods being oppositely driven. The cross head 21 is guided in its vertical movement by the guide rods 24 which are rifled in the sockets 6 and secured in sockets in the tie bar 25′. The cross head 22 is guided in its vertical movement by the guide rods 28 and 24 which are rifled in the sockets 6 and secured in sockets in the tie bar 25′. A stuffing box 37 is mounted on the cross head 21 for the piston rod 36.

Pinions 27 are mounted rigidly on shaft 18 and drive the gear wheels 26 which are mounted on shafts 18′. The shaft 18 is provided with a loose pulley 27′ and a fast pulley 26′ which is the power pulley. The drive wheels 26 move the cross head 22 by means of pitmen rods 19 which are bent at the ends to engage bearings 25 in the cross head 22 and also bent at the lower ends to engage the drive wheels 26. Bronze bushings 30 are provided with lugs to prevent the bearings from turning in the cross head and the bushings 30 are inserted in the bearings 25 with the lugs also embedded in the bearings 25. The longitudinal centers of the bearings 25 are in line with the plane which runs vertically through the center of the gear wheel 26 and pinion 27 so that there will be no cross strain of the pitman rod 19. The cross head 21 is driven by pitman rods 20 which are similar to pitman rods 19 and the pitman rods 20 are pivotally connected to crank disks 20′. These disks are rigid with shafts 18′ and consequently the disks are driven by the power from the gear wheels 26 which power is transmitted by means of the shafts 18′. The shafts 18′ are parallel to the shaft 18 and the wheels 26 are geared in unison, and, by reason of the connections of the crank disks 20′, the shafts 18′ operate as a single shaft.

The bearings 11 of the bearing walls 2 and the bearings 10 of the bearing walls 1 are off-set relative to the centers of the vertical guide rods 24 and 28 and consequently the vertical centers of the cross heads for the purpose of securing greater power from the drive wheels. By reason of this arrangement of the off-set bearings with certain dimensions approximately 17% more time is required to make the up stroke of the piston rods than the down stroke, thus reducing the strain on the lifting parts in the same ratio as the strain is less on this plan than if the time were divided equally between the down stroke and the up stroke as is common in other pump jacks. This means the time of one revolution of the driving gear. There is a further advantage of getting a quick return of the down stroke in permitting the valves to close quicker. It also permits the valves to start slower increasing in speed after they are in motion by which the best possible result is obtained and which is not possible when the time of the stroke is evenly divided between the up and down stroke.

The universal pipe centerer consists of a cylindrical casting 14 with arms 15 which have ribs integral therewith and which project up to the top of the castings. Sockets 37′ are formed in the casting 14 and in these sockets are pivoted dogs 38 which have lugs 39 projecting into vertical grooves in the walls of the sockets 37′. The dogs 38 will thus swing inwardly at the free ends and engage the pipe 40 by which the pipe can be accurately centered. The dogs 38 are pivotally mounted by reason of the lugs 39 which project into the grooves in the walls of the sockets 37′.

Having fully described my invention, what I claim as new and desire to secure by Letters Patent, is:—

1. A pump-jack for double acting pumps comprising a base consisting of two bearing members each having two bearing walls formed of an integral structure and a curved flanged binding member bolted to each of said members and making said members rigid with each other, the front ends of said bearing members having four sockets formed therein in alinement with each other, four vertical guide rods rifled in said sockets, an interior piston rod cross-head adapted to move vertically on all of said guide rods, an exterior piston rod crosshead adapted to move vertically on the two central guide rods, gear wheels for driving said interior piston cross-head having shafts journaled in the exterior walls of said bearing members and pitmen operatively connecting said cross-head with said gear-wheels, crank disks for driving said exterior piston cross-head operated by said gear wheels, and pitmen operatively connecting said cross-head and said disks, and means for driving said gear wheels.

2. A pump-jack having a rigid base consisting of two pairs of walls, each pair having an integral connection at the ends, constituting bearing walls and means for making said bearing walls rigid with each other, sockets for guide rods being formed in said walls, vertical guide rods rigid in said sockets, cross-heads adapted to move on said guide rods, gearing and pitmen rods operatively connected with said gearing and with said cross-heads, shafts for said gearing, and bearings for said shafts offset in said bearing walls relative to the centers of said guide rods and cross-heads.

3. A pump-jack having a base consisting of two bearing members rigid with each other and each having two bearing walls, the front ends of said walls having sockets formed therein, four parallel vertical guide rods rifled in said sockets, an interior piston rod cross-head adapted to move on all of said guide rods, an exterior piston rod crosshead adapted to move on the two central guide rods, gear wheels and pitmen for driving said interior piston rod cross-head, shafts for driving the said gear wheels journaled in the exterior walls of said bearing members, crank disks and pitmen for driving said exterior piston rod cross-head, a pair of disks being connected to each pitman, the exterior disk for each pitman being rigid with the shaft of the adjacent gear wheel, a shaft for the interior disks journaled in the interior walls of said bearing members, a shaft journaled in all of said walls, and gearing on said shaft for driving said gear wheels, and means for driving said shaft.

4. A pump-jack having a base consisting of four rigid parallel bearing walls having sockets formed in the front ends thereof, four parallel guide rods rifled in said sockets and a tie bar connected to the upper ends of the guide rods, an interior piston rod cross-head adapted to move on all of said rods, an exterior piston rod cross-head adapted to move on the two central guide rods, pitmen and gearing operatively connected with said cross-heads and with said bearing walls for moving said cross-heads, braces for the two exterior guide rods rigidly connected to said tie bar and to the rear ends of the exterior bearing walls, and braces for the two interior guide rods rigidly connected thereto at points between the travel of said cross-heads and to the rear ends of the interior bearing walls.

5. A pump-jack having a rigid base consisting of bearing walls and means for making said walls rigid with each other, sockets for guide rods formed in said bearing walls, vertical guide rods rigid in said sockets, cross-heads adapted to move on said guide rods, gearing and pitman rods operatively connected with said gearing and said cross-heads, shafts for said gearing journaled in said bearing walls, means for driving said gearing, and a pipe centerer at the front end of the pump-jack consisting of a vertical cylinder having laterally extending arms projected under the two adjacent bearing walls, said bearing walls having cutouts thereunder to receive said arms, and dogs pivotally mounted in said cylinder for engaging the pipe.

6. A pump-jack consisting of bearing walls and means for making said walls rigid with each other, sockets for guide rods being formed in said bearing walls, vertical guide rods rigid in said sockets, a cross-head adapted to move on said guide rods, bearings in said cross-head, gear wheels and bearings in said gear wheels, removable bushings in said bearings, and pitman rods having bent ground journals engaging said bearings for driving said cross-head, the centers of the bearings in said cross-head being in a vertical plane passing through the centers of said gear wheels.

7. In a double acting pump-jack, the combination of a bed, guide rods rising therefrom, horizontal shafts journaled in the bed and carrying wheels on the outer ends and crank disks on the inner ends, and cross-heads guided vertically on said rods, one above the other, one of said cross-heads being connected to said wheels and the other cross-head being connected with said crank disks.

8. In a double acting pump-jack, the combination of a bed, guide rods rising therefrom, horizontal shafts journaled in the bed and carrying gears and crank disks, a driving shaft journaled in the bed, and having pinions meshing with the respective gears, a cross-head guided on said rods and connected with said gears, and a second cross-head guided on said rods and connected with said crank disks.

9. In a double acting pump-jack, the combination of a bed, a driving shaft journaled horizontally therein, driven shafts journaled in the bed parallel to the driving shaft and carrying wheels and crank disks, the crank disks being arranged longitudinally between the wheels, upright guide rods rising from the bed on each side of each pair of and forward of the crank disks, an upper cross-head guided on said rods and connected by pitmen with said wheels, and a lower cross-head guided on said rods and connected by pitmen with said crank disks.

10. In a double acting pump-jack, the combination of a bed, a driving shaft journaled horizontally therein and carrying pinions, driven shafts journaled in the bed parallel to the driving shaft and carrying gears meshing with the respective pinions and carrying crank disks, guide rods rising from the bed, a pump-rod-carrying cross-head guided by said rods and connected with said gears on said driven shafts, and a second pump-rod-carrying cross-head below the first, guided on said rods and connected with said crank disks.

11. In a double acting pump-jack, the combination of a bed, guide rods rising therefrom, a relatively long cross-head guided on said rods at points between the center of said head and the ends of the same, whereby the ends of the cross-head project laterally beyond the guide rods, a second relatively short cross-head having its ends embracing the guide rods below the first named cross-head, pump rods carried by the respective cross-heads and telescoping with each other, and means to operate the cross-heads oppositely.

12. In a double acting pump-jack, the combination of upright guide rods, a relatively long cross-head guided on said rods and projecting at its ends beyond the same, an inner pump rod carried by said cross-head, a relatively short cross-head guided on said rods and having its ends embracing the latter, an outer pump rod of tubular form carried by said last named cross-head and surrounding the inner pump rod, and means to actuate said cross-heads oppositely, as described.

13. In a double acting pump-jack, the combination of a base, upright guide rods rising therefrom, cross-heads guided on said guide rods, one above the other, a horizontal shaft journaled on the base below the cross-head, means for driving said shaft, connections between the respective ends of said shaft and the upper cross-head, and connections between the shaft and the lower cross-head intermediate the first named connections.

14. In a double acting pump-jack, the combination of a base, upright guide rods rising therefrom, cross-heads guided on said guide rods, one above the other, horizontal shafts journaled on the base below the cross-head, means for driving said shafts, connections between the respective outer ends of said shafts and the upper cross-head, and connections between the shafts and lower cross-head intermediate the first named connections.

15. In a double acting pump-jack, the combination of a bed, upright guide rods rising therefrom, cross-heads guided on said guide rods, one above the other, horizontal shafts journaled on the bed below the cross-heads, means for driving said shafts, wheels on the outer ends of said shafts, pitmen connecting the respective wheels with the ends of one of the cross-heads, and an operative connection between the inner ends of said shafts and the ends of the other cross-head.

16. In a double acting pump-jack, the combination of a bed, upright guide rods rising therefrom, pump-rod-carrying cross-heads guided on said rods, one above the other, a driving shaft journaled horizontally on said bed and carrying pinions, driven shafts journaled horizontally on said bed parallel to the driving shaft and carrying disks and carrying gears meshing with the respective pinions, all of said shafts being located below the cross-heads, and means connecting the said gears with one cross-head and said disks with the other cross-head.

17. In a double acting pump-jack, the combination of a bed, upright guide rods rising therefrom, cross-heads guided on said rods, one above the other, horizontal shafts journaled on the bed below said cross-heads, means for driving said shafts, crank disks on the inner ends of said shafts each operatively connected with the lower cross-head, and operative connections between the respective outer end portions of the shafts and the upper cross-head.

18. In a double acting pump-jack, the combination of a bed, guide rods rising therefrom, shafts journaled horizontally on said bed, upper and lower cross-heads guided on said rods, the upper cross-head extending laterally at its ends beyond the guide rods, means connecting the ends of said upper cross-head to said shafts, and means connecting the ends of the lower cross-head to said shafts.

19. In a double acting pump-jack, the combination of a bed, upright guide rods rising therefrom, an upper cross-head guided on said guide rods and extending at its ends laterally beyond said rods, a lower cross-head guided on said rods, a horizontal shaft journaled on the bed, means connecting said lower cross-head with the intermediate portion of said shaft, wheels on the ends of said shaft, and pitmen connecting said wheels with the respective ends of the upper cross-head.

20. A pump jack having bearing walls and means for making said bearing walls rigid with each other, vertical guide rods rigid with said bearing walls, a cross-head adapted to move on said guide rods, bearings in said cross-head, gear wheels and bearings in said gear wheels, and interchangeable pitmen rods, each having a bent ground journal on each end, engaging said bearings for driving said cross-head.

21. In a double acting pump-jack, the combination of upright guide rods, a relatively long cross-head guided on said rods and projecting at its ends beyond the same, an inner pump rod carried by said cross-head, a relatively short cross-head guided on said guide rods and having its ends embracing the latter, an outer pump-rod of tubular form carried by said last named cross-head and surrounding the inner pump rod, a stuffing box for said inner pump rod carried by said lower cross-head, and means to actuate said cross-heads oppositely.

In testimony whereof, I set my hand in the presence of two witnesses, this the 8th day of October, A. D. 1912.

FRED W. AXTELL.

Witnesses:
J. W. Stitt,
A. L. Jackson.